Figure 1:
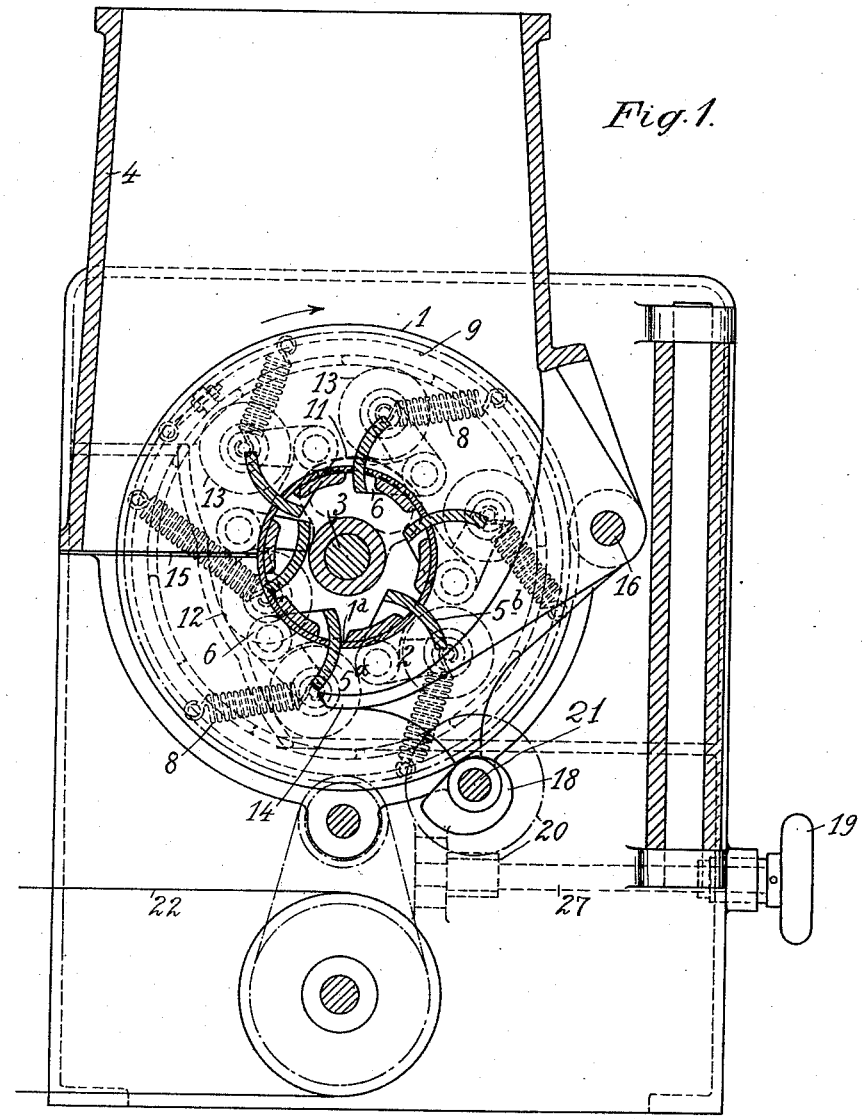

O. TEICHMANN.
DOUGH DIVIDING MACHINE.
APPLICATION FILED DEC. 17, 1909.

1,019,556.

Patented Mar. 5, 1912.

3 SHEETS—SHEET 1.

Witnesses.
W. R. Schulz.
Edward Schorr.

Inventor.
Otto Teichmann
by his attorney
Frank V. Briesen

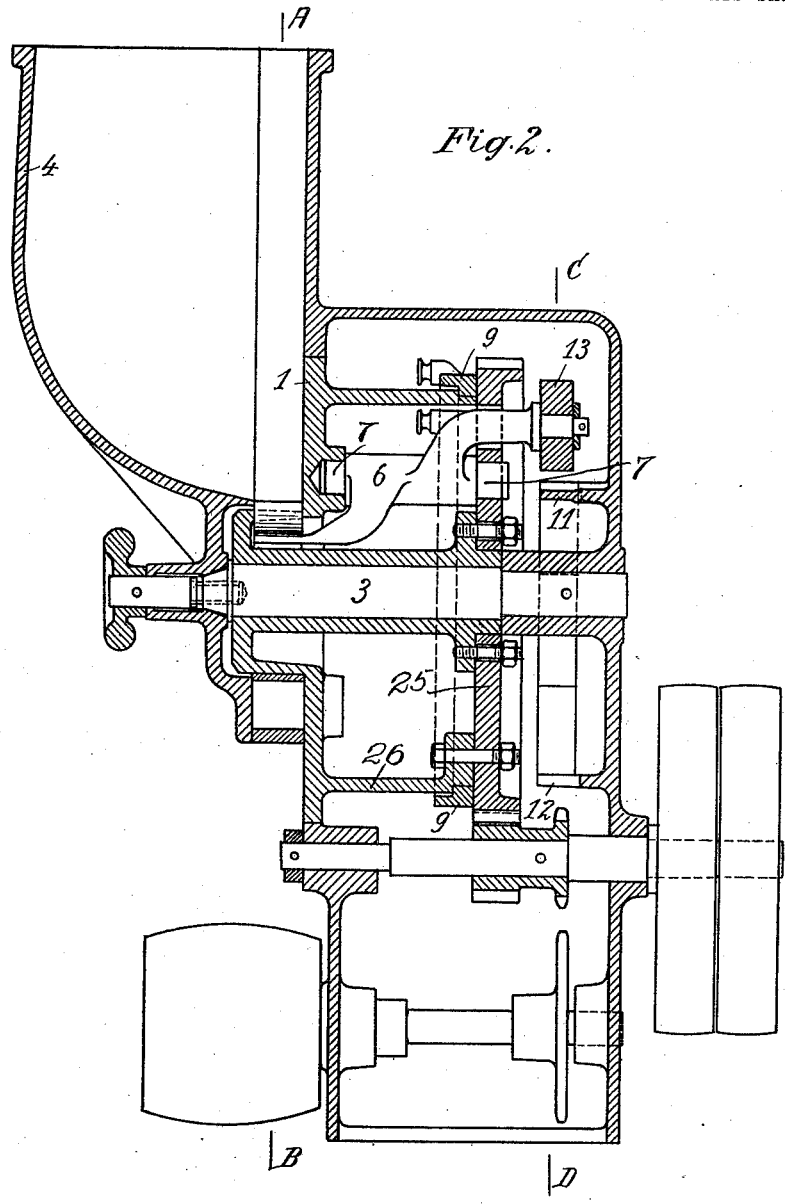

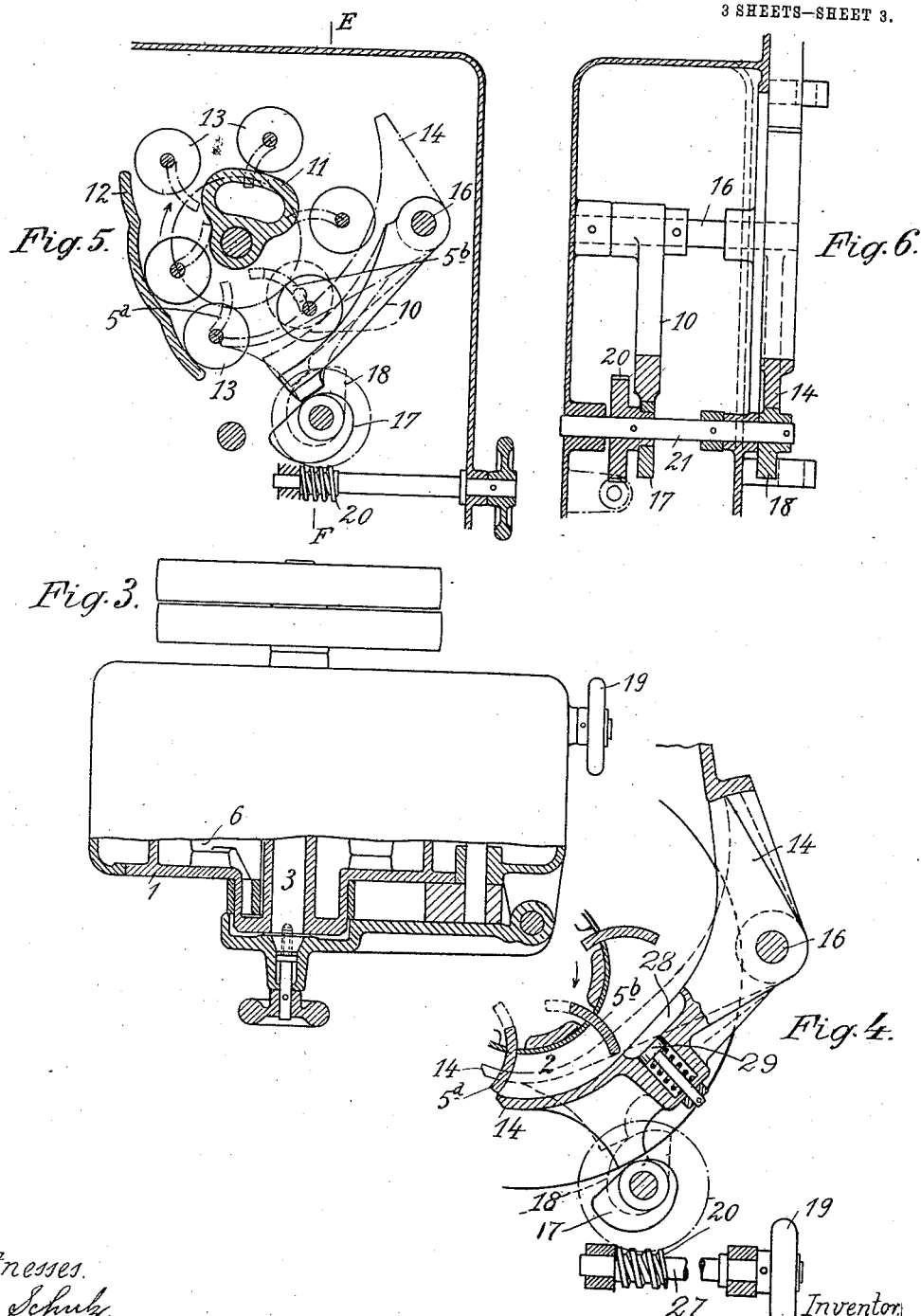

UNITED STATES PATENT OFFICE.

OTTO TEICHMANN, OF STUTTGART-CANNSTATT, GERMANY.

DOUGH-DIVIDING MACHINE.

1,019,556.  Specification of Letters Patent.  Patented Mar. 5, 1912.

Application filed December 17, 1909. Serial No. 533,714.

*To all whom it may concern:*

Be it known that I, OTTO TEICHMANN, a citizen of Germany, and residing at Stuttgart-Cannstatt, Wurttemberg, Germany, have invented a new and useful Dough-Dividing Machine, of which the following is a specification.

This invention relates to a novel machine for dividing dough into batches, which is so constructed that the size of said batches may be readily regulated without affecting the density of the dough.

In the accompanying drawing: Figure 1 is a vertical section of a dough dividing machine embodying my invention, on line A—B, Fig. 2; Fig. 2 a vertical central section at right angles to Fig. 1; Fig. 3 a plan partly in section; Fig. 4 a detail vertical section of the dough dividing means proper; Fig. 5 a vertical section on line C—D, Fig. 2; and Fig. 6 a vertical section at right angles to Fig. 5.

The machine comprises essentially a dough dividing disk 1 rotatably mounted upon a stationary axle 3 and adapted to close the egress opening of a hopper 4. Disk 1 carries a slotted cutter head 1ª in which is guided a plurality of curved knives or cutters 5 forming intervening cells 2. Cutters 5 are fast on levers 6, the trunnions 7 of which are mounted in corresponding recesses of disk 1 and of a toothed driving wheel 25 bolted to a flange 26 of said disk. Cutters 5 are influenced by springs 8 that tend to withdraw the cutters from head 1ª, said springs being connected to an adjustable ring 9 which is guided in a circumferential groove of flange 26, thus permitting a simultaneous regulation of the strength of all springs 8. Each lever 6 carries a roller 13 that is adapted to consecutively engage cam surfaces 10, 11, 12 whereby the desired oscillative movement is imparted to each cutter. While cutters 5 pass through the lower part of hopper 4, they occupy their outermost positions owing to the combined action of springs 8 and cam 11. In this way the dough may enter cells 2 from various directions to be conveyed through the gradually narrowing egress duct of the hopper until the cutters come into contact with a gate 14 and thereby divide the dough into batches of equal sizes, the drawing showing cutters 5ª and 5ᵇ in engagement with gate 14. As soon as cutters 5 clear the gate, they are moved inward owing to the engagement of their rollers 13 with cam surface 12, so that the separated batches are free to drop on a suitable conveyer belt 22. To prevent an undesirable adhesion of the batches to disk 1 there may be provided a scraper 23 as illustrated in Fig. 8. Cutters 5 are maintained in their retracted positions until they have been carried beyond the hopper bottom 15 (Fig. 1) whereupon their rollers 13 clear cam 12 thus permitting springs 8 to project the cutters outward.

It is preferred to set cutters 5 back from the periphery of disk 1 so that the protruding portion of the disk will assist the cutters in feeding the dough toward and into the egress duct of hopper 4.

In order to vary the size of the separated dough batches, gate 14 is pivotally supported and may be swung toward and away from cutter head 1ª to correspondingly vary the depth of cells 2. It will be seen that while the dough is fed through the gradually narrowing egress duct and along gate 14 to the point of division, a compression of the dough takes place. This compression should be alike with all sizes of the batches to insure uniform density, for which purpose cam 10 is also pivotally supported and is swung inward whenever gate 14 is swung inward. In this way, cutters 5 are held properly spaced from gate 14 prior to the dividing operation to permit the return of the surplusage of dough into hopper 4 thus preventing an excessive amount of dough from being separated from the bulk thereof whenever small batches are formed. Cam 10 and gate 14 are loosely mounted upon a common axle 16, cam 10 being engaged by an eccentric cam 17 while gate 14 is influenced by an eccentric cam 18, both of said cams being secured to a shaft 21 which may be set by a hand wheel 19 through shaft 27 and worm gear 20. In this way cam 10 and gate 14 may be simultaneously adjusted to any desired size of the batches by properly manipulating wheel 19. The curved cutters 5 are shown to be provided with comparatively thick outer edges which may act as pressure equalizers by being forced inward against the action of springs 8, whenever the compression of the dough should become excessive. Gate 14 may be further provided with a return duct 28 coöperating with a spring-influenced plunger 29 for preventing the formation of excessive pressure within cells 2 as illustrated in Fig. 4.

I claim:

1. In a machine of the character described, a hopper having an egress duct, a dividing disk arranged in proximity to said duct and having a slotted cutter head, levers fulcrumed to said disk, spring-influenced curved cutters on said levers and engaging the head-slots, and cams adapted to be engaged by the levers.

2. In a machine of the character described, a hopper having an egress duct, a dividing disk arranged in proximity to said duct and having a slotted cutter head, levers fulcrumed to said disk, curved broad-edged cutters on said levers that pass through the head-slots and are adapted to form intermediate dough receiving cells, and springs tending to draw the cutter edges into engagement with the outer wall of the egress duct, said springs being so tensioned as to permit a receding movement of the cutters upon an excessive compression of the dough within the cells.

3. In a machine of the character described, a hopper having a gate, a dividing disk arranged in proximity to said gate, spring-influenced cutters carried by the disk and adapted to engage the gate, and means for setting said gate.

4. In a machine of the character described, a hopper having an adjustable gate, a dividing disk arranged in proximity to said gate, spring-influenced cutters carried by the disk, and an adjustable cam coöperating with the cutters for regulating the distance between the cutters and gate.

5. In a machine of the character described, a hopper having a movable gate, a rotative dividing disk arranged in proximity to said gate, spring-influenced cutters carried by the disk and adapted to engage the gate, a movable cam coöperating with the cutters for regulating the distance between cutters and gate prior to their engagement, and means for simultaneously setting the gate and cam.

6. In a machine of the character described, a hopper, a gate pivoted thereto and having a return duct, a pressure equalizing plunger coöperating with said duct, a rotative dividing disk arranged in proximity to the gate, spring-influenced cutters carried by the disk and adapted to engage the gate, a pivoted cam coöperating with the cutters for regulating the distance between cutters and gate prior to their engagement, and means for simultaneously setting the gate and cam.

In witness whereof I have hereunto set my hand this 12th day of November, 1909, in the presence of two subscribing witnesses.

OTTO TEICHMANN.

Witnesses:
WOLDEMAR HAUPT,
HENRY HASPER.

---

Copies of this patent may be obtained for five cents each, by addressing the "Commissioner of Patents, Washington, D. C."